(12) United States Patent
Inoue

(10) Patent No.: US 9,413,045 B2
(45) Date of Patent: Aug. 9, 2016

(54) BATTERY PACK

(71) Applicant: DENSO CORPORATION, Kariya, Aichi-pref. (JP)

(72) Inventor: Yoshimitsu Inoue, Chiryu (JP)

(73) Assignee: DENSO CORPORATION, Kariya (JP)

( * ) Notice: Subject to any disclaimer, the term of this patent is extended or adjusted under 35 U.S.C. 154(b) by 127 days.

(21) Appl. No.: 14/445,225

(22) Filed: Jul. 29, 2014

(65) Prior Publication Data

US 2015/0030890 A1    Jan. 29, 2015

(30) Foreign Application Priority Data

Jul. 29, 2013 (JP) ................................ 2013-156707

(51) Int. Cl.
| | |
|---|---|
| *H01M 10/613* | (2014.01) |
| *H01M 10/656* | (2014.01) |
| *H01M 10/6557* | (2014.01) |
| *H01M 10/617* | (2014.01) |
| *H01M 10/625* | (2014.01) |
| *H01M 2/10* | (2006.01) |
| *H01M 10/647* | (2014.01) |
| *H01M 10/6565* | (2014.01) |
| *H01M 10/6566* | (2014.01) |
| *H01M 2/12* | (2006.01) |

(52) U.S. Cl.
CPC ........ *H01M 10/5016* (2013.01); *H01M 2/1077* (2013.01); *H01M 10/613* (2015.04); *H01M 10/625* (2015.04); *H01M 10/647* (2015.04); *H01M 10/6557* (2015.04); *H01M 10/6565* (2015.04); *H01M 10/6566* (2015.04); *H01M 2/1252* (2013.01); *H01M 2220/20* (2013.01)

(58) Field of Classification Search
CPC ..................... H01M 10/5004; H01M 10/5016; H01M 10/5059; H01M 10/613; H01M 10/625; H01M 10/647; H01M 10/6557; H01M 10/6565; H01M 10/6566; H01M 2220/20; H01M 2/1077; H01M 2/1252
See application file for complete search history.

(56) References Cited

U.S. PATENT DOCUMENTS

| | | | | | |
|---|---|---|---|---|---|
| 4,468,440 | A | * | 8/1984 | Evjen .................... | H01M 10/63 429/120 |
| 5,585,205 | A | * | 12/1996 | Kohchi .................... | B60K 1/04 180/65.1 |
| 7,896,063 | B2 | * | 3/2011 | Shimoyama .............. | F28F 1/12 165/121 |
| 2009/0202900 | A1 | * | 8/2009 | Kuroda .................... | H01G 9/06 429/156 |
| 2013/0143082 | A1 | * | 6/2013 | Kim .................... | H01M 2/1077 429/82 |
| 2015/0037633 | A1 | * | 2/2015 | Akiyama ............ | H01M 2/1077 429/83 |

FOREIGN PATENT DOCUMENTS

JP    2007-329047    12/2007

* cited by examiner

*Primary Examiner* — Carlos Barcena
(74) *Attorney, Agent, or Firm* — Nixon & Vanderhye P.C.

(57) ABSTRACT

A battery pack includes battery stacks each formed of battery cells stacked on one another and bus bars disposed at a first end side of the battery stack for connection between electrode terminals of the battery cells, a battery pack case housing the battery stacks, a fan device disposed inside the battery pack case for circulating fluid within the battery pack case and a spacer disposed between respective adjacent battery cells to guide the fluid to flow in a direction from the first end side to a second end side opposite to the first end side along lateral sides of the battery cells. Each of the battery cells includes a battery cell case as an outer shell thereof that includes an exposed portion having a predetermined exposed length by which the battery cell case projects from an end at the first end side of the spacer.

12 Claims, 6 Drawing Sheets

BATTERY PACK

This application claims priority to Japanese Patent Application No. 2013-156707 filed on Jul. 29, 2013, the entire contents of which are hereby incorporated by reference.

BACKGROUND OF THE INVENTION

1. Field of the Invention

The present invention relates to a battery pack including battery stacks each formed of unit batteries stacked on one another, the battery packs being arranged in a battery pack case.

2. Description of Related Art

It is known to mount a battery pack case on a hybrid vehicle which has, as a vehicle driving source, a combination of an internal combustion engine and a battery-driven motor, or an electric vehicle, the battery pack case housing secondary battery cells for powering a vehicle-driving motor.

The secondary battery cells generate heat due to Joule heat due to a current and chemical reaction when charged or discharged. This heat generation occurs mainly at the vicinity of the electrode terminals of the battery cells. Accordingly, the above battery pack is configured to use its bus bars or the like directly connected to the electrode terminals as heat transmission paths for dissipating the heat to coolant such as air.

For example, the battery pack described in the Japanese Patent Application Laid-open No. 2007-329047 has a structure in which a spacing is provided between each adjacent two of the battery cells, and the cooling air blown from a fan flows through the spacings so that the cooling air hits the entire of the heat dissipation surface of each of the battery cells as much as possible. Incidentally, this battery pack is configured such that the cooling air does not leak in directions other than the cooling direction to provide a high cooling performance. Further, this battery pack includes bus bars, cables and an exhaust duct at places other than the passage of the cooling air.

However, the battery pack described in the above patent document has a problem in that the amount of heat transmission from the battery cells to the inner surface of the battery pack case has to be increased by increasing the circulation amount of the cooling air with the reduction of the size of the battery pack case.

On the other hand, to reduce the size of the battery pack case, the bus bars, cables and exhaust duct have to be disposed in the vicinity of the electrode terminals. In the so-called vertical flow type of a battery pack in which cooling air is blown from the upward side to the downward side with respect to battery cells, electrode terminals and bus bars (or an exhaust duct or an electronic component in some cases) which are disposed on the upward side become an obstacle to the flow of cooling air, causing the cooling performance to be degraded.

SUMMARY

An exemplary embodiment provides a battery pack including:

battery stacks each formed of battery cells stacked on one another and bus bars disposed at a first end side of the battery stack for connection between electrode terminals of the battery cells;

a battery pack case housing the battery stacks;

a fan device disposed inside the battery pack case for circulating fluid within the battery pack case; and a spacer disposed between respective adjacent battery cells to guide the fluid blown from the fan device to flow in a direction from the first end side to a second end side opposite to the first end side along lateral sides of the battery cells, wherein each of the battery cells includes a battery cell case as an outer shell thereof that includes an exposed portion having a predetermined exposed length by which the battery cell case projects from an end at the first end side of the spacer.

According to the exemplary embodiment, there is provided a battery pack which includes battery stacks and is capable of sufficiently cooling its battery cells stacked on one another in each of the battery stacks.

Other advantages and features of the invention will become apparent from the following description including the drawings and claims.

PREFERRED EMBODIMENTS OF THE INVENTION

Figure 1:
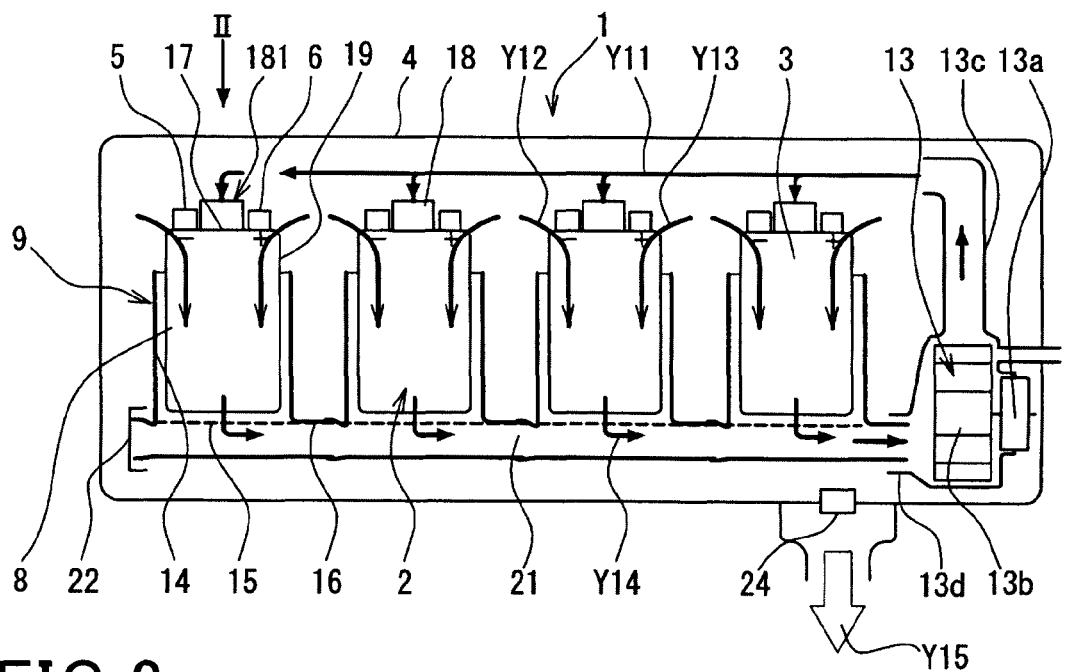
FIG. 1 is a diagram schematically showing the internal structure of a battery pack according to a first embodiment of the invention.

In the below described embodiments, parts or components which are the same or equivalent to those described in the preceding embodiments may be designated by the same reference numerals or characters. In the below described embodiments, when only part of the entire structure is explained, descriptions of the preceding embodiments can be referred to for the other parts.

It should be noted that two or more of the below described embodiments can be combined when there is a statement to that effect, or if no substantive obstacle is expected in the combination.

First Embodiment

A battery pack 1 according to a first embodiment of the invention is described with reference to FIGS. 1 to 4.

Figure 2:
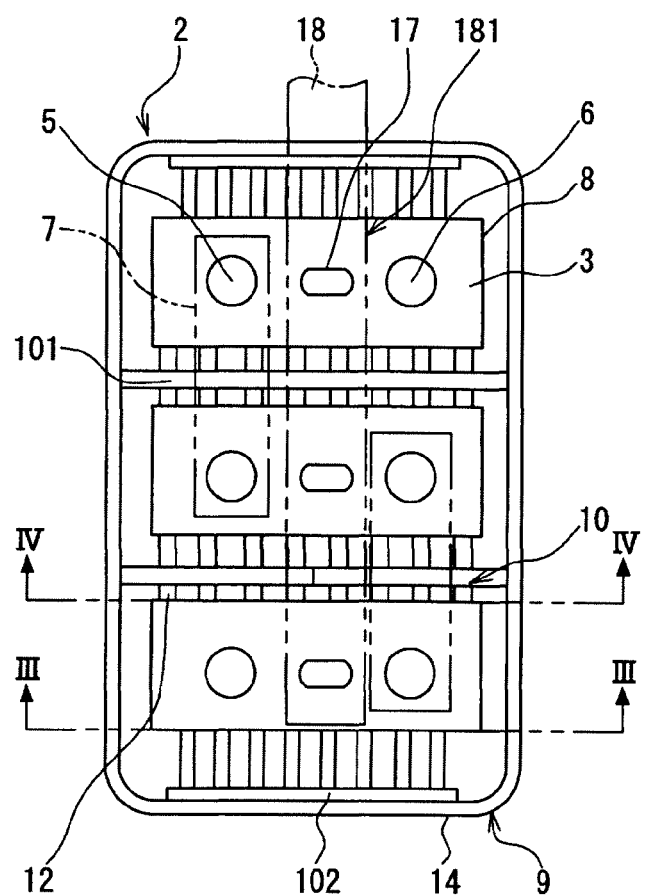
FIG. 2 is a plan view of the battery pack according to the first embodiment as viewed from the arrow II in FIG. 1.

FIG. 1 is a diagram schematically showing the internal structure of the battery pack 1. FIG. 2 is a plan view of the battery pack 1 as viewed from the arrow II in FIG. 1. The battery pack 1 is used for a hybrid vehicle which uses as a vehicle driving engine a combination of an internal combustion engine and a battery-driven motor or an electric vehicle.

The battery pack 1 includes battery stacks 2 each formed of secondary battery cells 3. The battery stacks 2 dissipate heat to the atmosphere through a case 4 which houses the battery stacks 2.

The battery cells 3 generate heat by Joule heat due to a current and chemical reaction when charged or discharged.

This heat generation occurs mainly at the vicinity of the electrode terminals of the battery cells 3. Accordingly, the battery pack 1 is configured to use its bus bars 7 directly connected to the electrode terminals 5 and 6 as heat transmission paths for dissipating the heat to coolant such as air. The bus bars 7 are for electrical connection between the electrode terminals 5 and 6.

Each battery cell 3 is a rechargeable lithium-ion battery. Each battery cell 3 includes a battery cell case 8 as its outer shell. The battery cell case 8 is constituted of a can body made of metal or resin and a lid which closes the opening of the can body.

The battery pack 1 includes a battery pack case 4 which is closed and has a roughly rectangular shape. The battery pack case 4 is made of metal and houses the battery stacks 2 in a sealed state. The heat within the battery pack case 4 is dissipated to the atmosphere.

In this embodiment, four battery stacks 2 are arranged in the battery pack case 4 as shown in FIG. 1.

Each of the battery stacks 2 is constituted of three battery cells 3 stacked on one another within a battery stack case 9 having a case shape. A spacer 10 is provided between each adjacent two of the battery cells 3, and between the battery cells 3 at both ends and the inner wall of the battery stack case 9. The spacer 10 provided between adjacent battery cells 3 is disposed so as to be in contact with the surfaces of the battery cells 3. The spacer 10 is provided for at least one of electrical insulation between the adjacent battery cells 3, formation of a cooling air path, guiding of cooling air and prevention of expansion of the battery cells 3.

The spacer 10 is made of insulating material, and disposed so as to from a gap 12 between the adjacent battery cells 3 or between the battery cell 3 and the battery stack case 9 through which the cooling air can flow. The spacers 10 are disposed respectively on the lateral sides of the respective battery cells 3. The spacers 10 includes double-sided spacers 101 each having comb-shaped projections on both lateral sides and single-sided spacers 102 having comb-shaped projections on one lateral side.

The spacer 10 may have any shape if the gaps 12 can be formed and the battery cells 3 can be cooled uniformly by the cooling air passing through the gaps 12. The spacers 10 each disposed between the adjacent battery cells 3 form passages to enable the cooling air blown from a fan device 13 (see FIG. 1) to flow along the lateral sides of the battery cells 3.

As shown in FIG. 2, the battery cell 3 includes a positive electrode terminal 5 and a negative electrode terminal 6 at the upper side. Here, the upper side is the side of the ceiling of the vehicle. Each battery stack 2 is housed in a battery holding part 14 constituting part of the battery stack case 9. In this embodiment, the battery stack case 9 and the battery holding part 14 are made of metal. However, they may be made of synthetic resin.

As shown in FIG. 1, there are four battery holding parts 14 in this embodiment. Each battery holding part 14 is formed with a bottom portion 15 of a wire mesh structure having aeration property. A blocking part 16 is provided between the respective adjacent battery holding parts 14, that is, between the respective adjacent battery stacks 2 to block the cooling air. Accordingly, the cooling air blown from the fan device 13 does not flow between the respective adjacent battery stacks 2.

The fan device 13 is disposed inside the battery pack case 4 to generate an air stream (the cooling wind) within the battery pack case 4. The fan device 13 includes a centrifugal fan 13b driven by a DC motor 13a to circulate the air within the battery pack case 4. The fan device 13 includes also a blower case 13c having a funnel shape extending upward to form an airstream indicated by arrows Y11, Y12, Y13 and Y14.

The electrode terminals 5 and 6 as output terminals of each battery cell 3 project upward. Between the electrode terminals 5 and 6, there is formed an exhaust part 17 (see FIG. 2) configured to open to exhaust gas when the pressure of the inside of the battery cell 3 exceeds a predetermined pressure. An exhaust duct 18 is provided so that the gas exhausted from the plurality of the exhaust parts 17 is collected and exhausted to outside the battery pack case 4.

The exhaust duct 18 is in contact with the surface of the battery cell 3 between the electrode terminals 5 and 6. In this embodiment, the four exhaust ducts 18 are provided with a collecting part (not shown) at whose one end the gas from the exhaust ducts 18 is collected. The other end of the collecting part opens to a pressure valve 24 disposed in the battery pack case 4, or is led outside the vehicle.

As shown in FIG. 2, the exhaust duct 18 is a channel made of synthetic resin which has a U-shaped cross section, and is connected with the exhaust parts 17. The electrode terminals 5 and 6 of each adjacent two of the battery cells 3 are connected to each other by the bus bar 7 made of a copper plate. The battery cells 3 are connected in series within the battery stack 2 through the bus bars 7. The bus bars 7 are omitted from FIG. 1. In FIG. 2, the bus bars 7 are shown by two-point chain lines so that the shape of the spacers 10 are easy to see.

Figure 3:
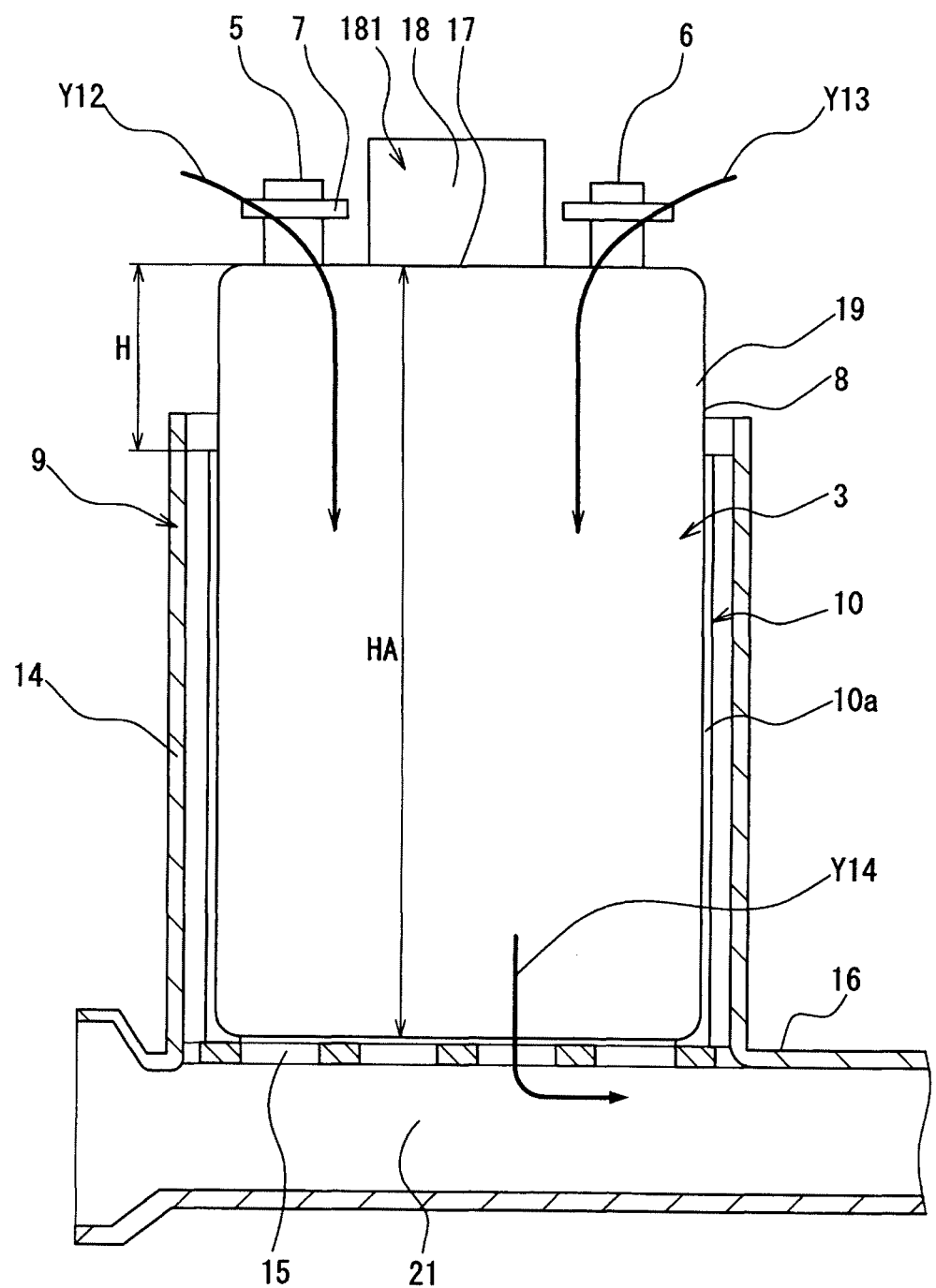
FIG. 3 is a partial cross-sectional view of FIG. 2 taken along arrows
Figure 4:
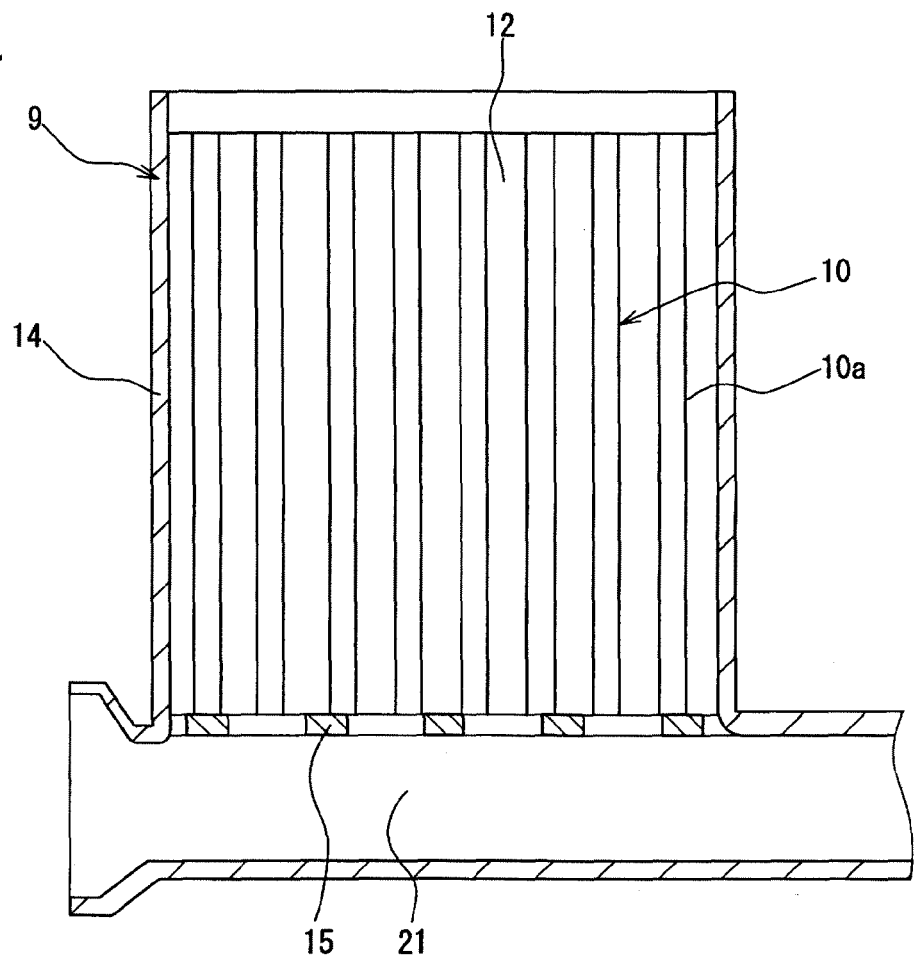
FIG. 4 is a partial cross-sectional view of FIG. 2 taken along arrows IV-IV.

FIG. 3 is a partial cross-sectional view of FIG. 2 taken along arrows III-III. FIG. 4 is a partial cross-sectional view of FIG. 2 taken along arrows IV-IV. The height of the spacer 10 is set such that the battery cell 3 is exposed at its exposed portion 19 having the exposed length of H.

The heat of the battery cell 3 is transmitted to the cooling air at the surface of the battery cell case 8. Preferably, the exposed length H is between 10% and 70%, more preferably between 20% and 60% of the height HA of the battery cell case 8 (the length from one end to the other end of the battery cell case 8).

That is, the battery cell 3 includes the exposed portion 19 projecting from the spacer 10 at its upper side so that the inflow side (the side at which the exhaust duct 18 forming a later-explained single-side mounted component 181 and the bus bars 7 are provided) is exposed to allow the cooling air to flow in easily.

The gaps 12 between the respective adjacent comb-shaped projections (or ribs) 10a of the spacer 10 form a passage of the cooling air to enable transferring the heat emitted from the lateral sides of the battery cells 3 to the inner surface of the battery pack case 4 through the cooling air and dissipating the heat from the battery case 4 to the atmosphere.

The cooling air that has passed through the gaps 12 of the spacers 10 passes through the bottom portion 15 of the wire mesh structure and is guided to an inlet 13d of the fan device 13 through a communicating passage 21 which constitutes part of the battery stack case 9. The communicating passage 21 is constituted of four tube parts connected in series.

One end of the communicating passage 21 is closed by a cover 22. The other end of the communicating passage 21 is connected to the fan device 13. The inlet 13d of the fan device 13*d* is in communication with the gaps of the spacers 10 so that the cooling air passing through the exposed portions 19 of the battery cells 3 is sucked into the inlet 13*d* of the fan device 13.

The pressure valve 24 provided in the bottom of the battery pack case 4 is opened when the pressure within the battery pack case 4 exceeds a predetermined pressure to discharge the gas as shown by the arrow Y15. The pressure valve 24 serves as a relief valve to discharge the gas emitting from the exhaust ducts 18.

Each exhaust duct 18 forms the single-side mounted component 181 provided on the upper side of the battery cell 3. The single-side mounted component 181 may be formed of, together with or instead of the exhaust duct 18, an electronic component for battery monitoring and controlling.

If the cooling air is blocked by the single-side mounted component 181 including at least one of the exhaust duct 18, the electronic component and the bus bar 7 connected to the electrode terminals 5 and 6, the battery cell 3 is prevented from being sufficiently cooled.

Accordingly, in this embodiment, the exposed portion 19 is provided between the single-side mounted component 181 and the battery holding part 14. The battery cell 3 is in intimate contact with the projections of the spacers 10 and surrounded by the battery holding part 14 at all portions thereof except the exposed portion 19. The battery cell 3 is cooled sufficiently by the cooling air passing through the gaps 12 between the projections 10*a* of the spacers 10.

This embodiment adopts the suction structure in which the cooling air around the battery cells 3 flows vertically along the surfaces of the battery cells, and the fan 13*b* of the fan device 13 is disposed downstream of the battery cells 3. In this suction structure, the lower portion of the single-side mounted component 181 which includes at least one of the electronic component, a cable of the electronic component, the bus bars 7 and the exhaust duct 18 is exposed as the exposed portion 19 to let the cooling air flow therealong.

That is, the surface of the battery cell 3 to be cooled is exposed from the spacer 10 or the battery holding part 14. By exposing the surface of the battery cell 3, it is possible to reduce the effect of the ventilation resistance due to the single-side mounted component 181 to thereby enable the battery cell 3 to be cooled sufficiently.

The battery pack 1 according to the first embodiment described above provides the following advantages. Since the effect of the ventilation resistance due to the single-side mounted component 181 is reduced by the provision of the exposed portion 19 to form the cooling air passage, it is possible to supply a sufficient amount of the cooling air by the small-power fan device 13. Since the largest heat-generating portion of the battery cell 3, which is in the vicinity of the electrode terminals 5 and 6, is exposed, heat dissipation from the battery cell 3 can be promoted.

The battery pack 1 includes the battery stacks 2 each having the stack of the battery cells 3 with the bus bars 7 disposed on the upper end of the stack for connection between the electrode terminals 5 and 6, and the battery pack case 4 housing the battery stacks 2. The fan device 13 is disposed within the battery pack case 4 to circulate the fluid (air) within the battery pack case 4.

The spacers 10 are disposed between the respective adjacent battery cells 3 so as to form passages to let the fluid blown from the fan device 13 flow along at least the lateral sides of the battery cells 3. The battery cell 3 includes the exposed portion 19 projecting from the spacers 10 at its upper side.

Since the battery cell 3 projects from the spacers 10 in the direction perpendicular to the stacking direction of the battery cells 3, the fluid 3 blown from the fan device 13 flows mainly to the exposed portion 19 of the battery cell 3.

The exposed portion 19 is a portion which emits the largest amount of heat of the battery cell. Accordingly, although the one side-mounted component 181 including the electrode terminals 5 and 6 and the bus bars 7 is disposed on the upper side of the battery cell 3, it is possible to supply a sufficient amount of the cooling air to the battery cell 3. This structure is advantageous in downsizing a battery pack having the structure in which battery stacks are housed in a closed battery pack case.

Comparative Example

Figure 5:
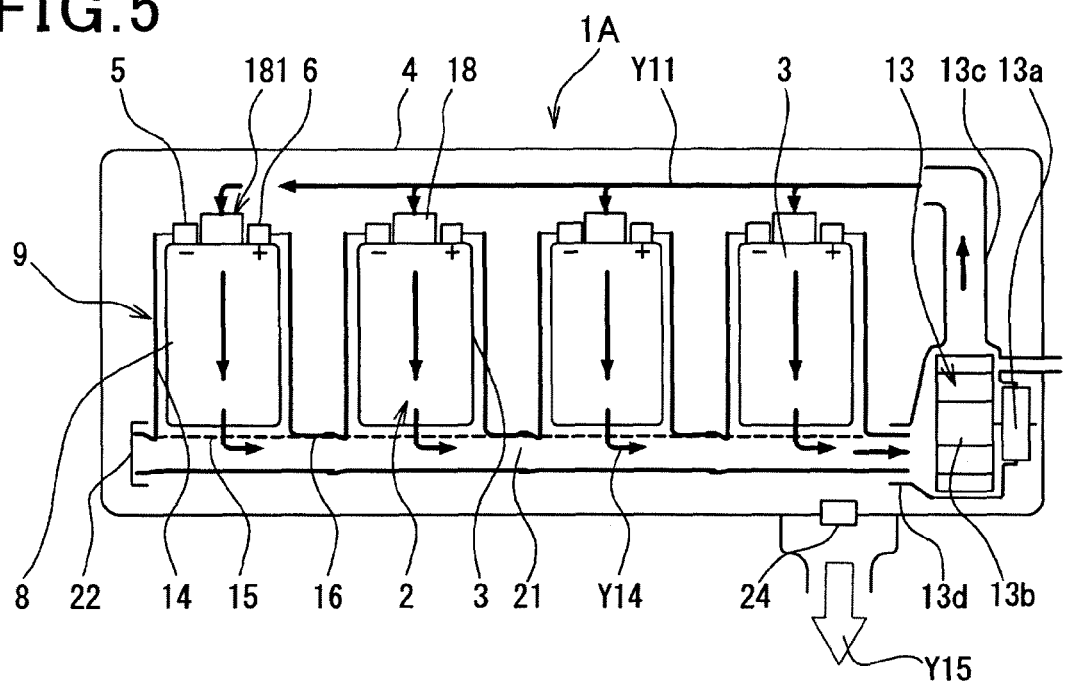
FIG. 5 is a diagram schematically showing the internal structure of a battery pack of a comparative example.

FIG. 5 is a diagram schematically showing the internal structure of a battery pack 1A as a comparative example for the first embodiment. The battery pack 1A includes the battery pack case 4 which is closed and has a roughly rectangular shape. In this comparative example, four battery stacks 2 are arranged in the battery pack case 4 as shown in FIG. 5.

Each of the battery stacks 2 is constituted of three battery cells 3 stacked on one another as in the first embodiment.

The spacer 10 (not shown) is provided between each adjacent two of the battery cells 3, and between the battery cells 3 at both ends and the inner wall of the battery stack case 9. As shown in FIG. 2, the battery cell 3 includes the positive electrode terminal 5 and the negative electrode terminal 6 at its upper side. Each battery stack 2 is housed in the battery holding part 14 which constitutes part of the battery stack case 9 holding the battery stack 2.

The battery holding part 14 is formed with the bottom part 15 of the wire mesh structure having aeration property. Between the respective adjacent battery holding parts 14, sealing is made to block the cooling air. The fan device 13 is disposed within the battery pack case 4.

The electrode terminals 5 and 6 as output terminals of each battery cell 3 project upward. An exhaust part configured to open to exhaust gas when the pressure of the inside of the battery cell 3 exceeds a predetermined pressure is provided between the electrode terminals 5 and 6.

The height of the battery stack case 9 is set so as to cover the entire lateral side of the battery cell 3. Likewise, the height of the spacer 10 is set so as to cover the entire lateral side of the battery cell 3. That is, the battery cells 3 are buried inside the battery holding part 14 constituting part of the battery stack case 9 and the spacers 10. Accordingly, the cooling air can flow in from the inflow side (the side at which the single-side mounted component 181 including at least one of the exhaust duct 18, the electronic component, the cable for the electronic component and the bus bars connected to the electrode terminals 5 and 6 is provided).

The gaps 12 between the respective adjacent comb-shaped projections of the spacers 10 form a passage of the cooling air to enable transferring the heat emitted from the lateral sides of the battery cells 3 to the inner surface of the battery pack case 4 through the cooling air and dissipating the heat from the battery case 4 to the atmosphere. The spacer 10 and the battery pack case 9 extend to the height of the can body of the battery cell 3 or higher, and the battery cell 3 does not include a portion equivalent to the exposed portion 19 in the first embodiment.

In this comparative example, since the cooling air is blocked by the single-side mounted component 181 such as the exhaust duct 18, the battery cell 3 cannot be cooled sufficiently. The projections of the spacer 10 are in intimate contact with the battery cell 3, and the battery cell 3 is cooled by the cooling air which passes through the gaps 12 within the spacer 10.

In contrast, in the first embodiment, since there is formed the cooling air passage along the exposed portion 19 and accordingly the ventilation resistance is reduced, a small-power fan device can be used as the fan device 13. Further, since the exposed portion 19 is located in the vicinity of the electrode terminals 5 and 6 around which the largest amount of the heat is generated, the heat dissipation from the battery cell 3 can be promoted.

The battery pack 1 according to the first embodiment includes the battery stacks 2 each having the stack of the battery cells 3 with the bus bars 7 for connection between the electrode terminals 5 and 6 which are disposed on the upper end of the stack, and the battery pack case 4 housing the battery stacks 2.

The fan device 13 is disposed within the battery pack case 4 to circulate the fluid (air) within the battery pack case 4. The spacers 10 are disposed between the respective adjacent battery cells 3 so as to form a passage to enable the fluid blown from the fan device 13 to flow along at least the lateral sides of the battery cells 3. The battery cell 3 includes the exposed portion 19 projecting from the spacers 10 at its upper side.

Since the battery cells 3 project from the spacers 10 in the direction perpendicular to the stacking direction of the battery cells 3, the fluid blown from the fan device 13 flows mainly to the exposed portions 19 of the battery cells 3.

The exposed portion 19 is a portion which emits the largest amount of heat of the battery cell 3. Accordingly, although the one side-mounted component 181 including the electrode terminals 5 and 6 and the bus bars 7 is disposed on the upper side of the battery cell 3, it is possible to supply a sufficient amount of the cooling air to the battery cell 3.

The single-side mounted component 181 including the electronic component for monitoring the battery cell 3 and the exhaust duct 18 for discharging gas emitted from the battery cell 3 is disposed on one side (the upper side) in the direction perpendicular to the stacking direction of the battery cells 3. The exposed portions 19 of the battery cells 3 are located between the single-side mounted components 181 and the spacers 10. Accordingly, the cooling air blown from the fan device 13 flows intensively toward the exposed portions 19 of the battery cells 3.

The portions other than the exposed portions 19 of the battery cells 3 are cooled by the cooling air passing through the gaps 12 within the spacers 10. As explained above, the surfaces of the battery cells 3 can be cooled efficiently by the cooling air guided by the spacers 10.

The battery pack case 4 houses the battery stacks 2 in a sealed state. Accordingly, the heat of the battery stacks 2 can be dissipated to the outside through the battery pack case 4. Further, the noise occurring while the battery stacks 2 are cooled can be reduced, and dust can be prevented from entering the battery pack case 4 to enable cooling the battery cells 3 uniformly so that the temperatures of the battery cells 3 can be kept uniform. Further, by supplying the cooling air by a sufficient amount to agitate the inside of the closed space, it is possible to apply the cooling air to the exposed portions 19 from various directions.

The spacers 10 are disposed separately from one another so as to face the lateral sides of the battery stacks 2, respectively. Accordingly, it is easy to change the height of the exposed portion 19 to adjust the cooling effect by the fan device 13 for each of the battery stacks 2. The inlet 13d of the fan device 13 is in communication with the gaps of the spacers 10 at the lower side, and the exposed portions 19 are in communication with the inlet 13d of the fan device 13 through the spacers 10. This makes it possible to effectively use the blowing performance of the fan device 13 to sufficiently cool the battery cells 3.

Between the adjacent battery stacks 2, the blocking part 16 is provided to block the cooling air blown from the fan device 13. This makes it possible to concentrate the blowing capacity of the fan device 13 to the exposed portions 19 to efficiently cool the battery cells 3.

Second Embodiment

Figure 6:
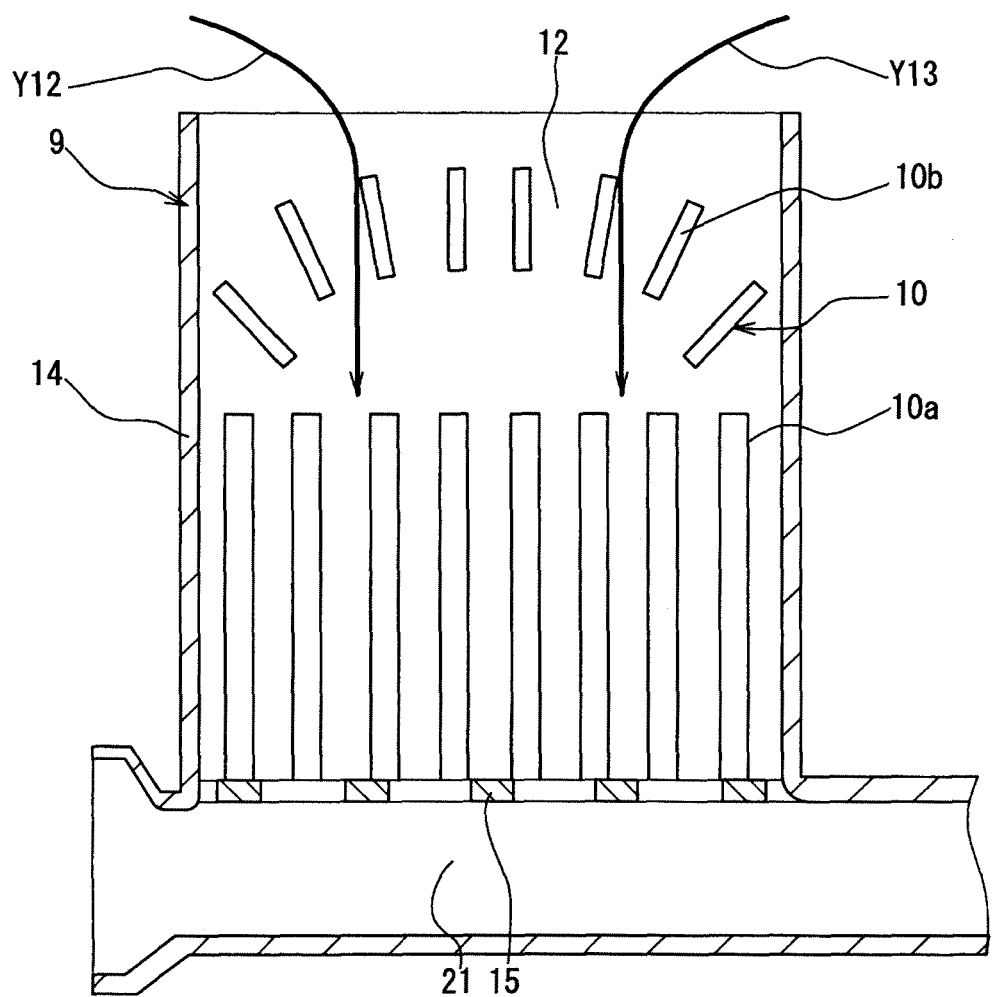
FIG. 6 is a partial cross-sectional view of a battery pack according to a second embodiment as viewed from the direction equivalent to the direction of arrows IV-IV in FIG. 2.

Next, a second embodiment of the invention is described. In the second and following embodiments, components or parts which are the same as or equivalent to the components or parts used in the first embodiment are indicated by the same reference numerals or characters. FIG. 6 is a partial cross-sectional view of a battery pack according to a second embodiment as viewed from the direction equivalent to the direction of arrows IV-IV in FIG. 2.

In the second embodiment, as shown in FIG. 6, the spacer 10 includes radial projections 10b disposed above the projections 10a. By the provision of the radial projections 10b, the amount of the cooling air flowing by way of the exposed portions 19 can be increased to increase the cooling performance. Incidentally, if the radial projections 10b are curved, the ventilation resistance can be further reduced to thereby further increase the amount of the cooling air.

Third Embodiment

Figure 7:
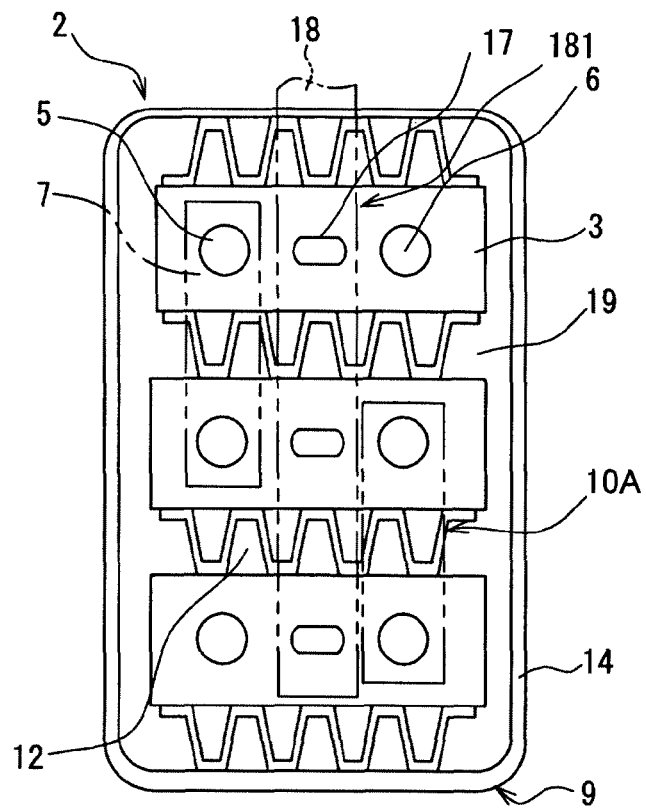
FIG. 7 is a plan view of a battery pack according to a third embodiment as viewed from the direction equivalent to the direction of the arrow II in FIG. 1.

Next, a third embodiment of the invention is described with a focus on differences with the above described embodiments. FIG. 7 is a plan view of a battery pack according to a third embodiment as viewed from the direction equivalent to the direction of the arrow II in FIG. 1.

In the third embodiment, each of the battery stacks 2 is constituted of three battery cells 3 stacked on one another as in the first embodiment. A spacer 10A having a corrugated shape is provided between each adjacent two of the battery cells 3, and between the battery cells 3 at both ends and the inner wall of the battery stack case 9. This spacer 10A is for electrical insulation between the adjacent battery cells 3, formation of a cooling air path, guiding of the cooling air, or prevention of expansion of the battery cells 3.

The spacers 10A are made of insulating material, and provide the gaps 12 allowing the cooling air to flow between the adjacent battery cells 3. The spacers 10A are disposed separately from one another so as to face the lateral sides of the battery stacks 2, respectively. The spacer 10A can be fabricated easily by molding resin material.

Since the spacer 10A has the corrugated shape, many gaps 12 are formed at both sides thereof, and the battery cells 3 can be cooled uniformly by the cooling air passing through the gaps 12. The spacers 10A are disposed between the respective adjacent battery cells 3 to form the cooling air path enabling the cooling air blown from the fan device 13 to flow along the lateral sides of the battery cells 3. In FIG. 7, the bus bars 7 connecting the electrode terminals 5 and 6 and the exhaust duct 18 are shown by two-dot chain lines so that the shapes of the spacers 10A can be recognized easily.

The third embodiment provides the following advantage. In the third embodiment, the spacers 10A having the corrugated shape are disposed separately from one another so as to face the lateral sides of the battery stacks 2, respectively. Accordingly, it is easy to change the height of the exposed portion 19 to adjust the cooling effect by the fan device 13 for each of the battery stacks 2.

Fourth Embodiment

Figure 8:
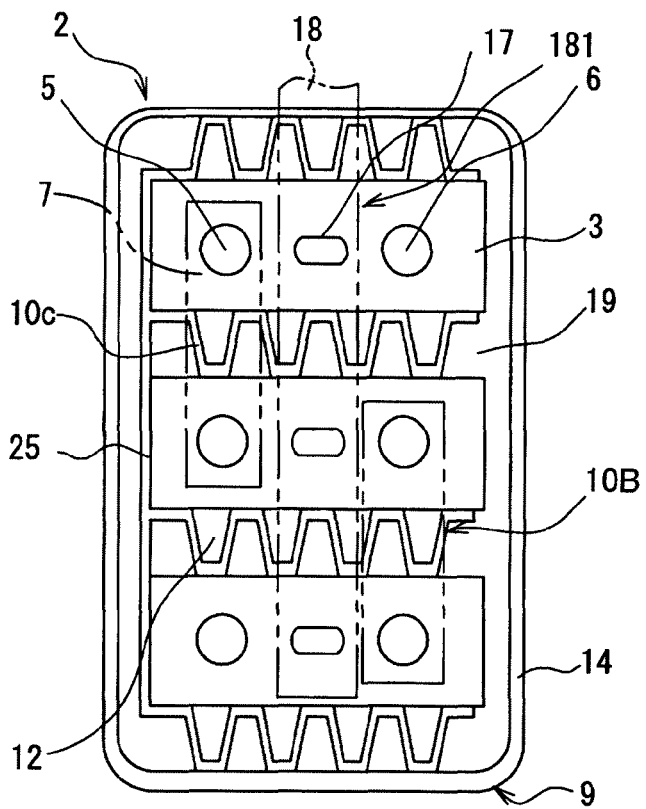
FIG. 8 is a plan view of a battery pack according to a fourth embodiment as viewed from the direction equivalent to the direction of the arrow II in FIG. 1.

Next, a fourth embodiment of the invention is described with a focus on differences with the above described embodiments. FIG. 8 is a plan view of a battery pack according to a fourth embodiment as viewed from the direction equivalent to the direction of the arrow II in FIG. 1.

In the fourth embodiment, each of the battery stacks 2 is constituted of three battery cells 3 stacked on one another as in the first embodiment. A spacer 10B having a corrugated shape is provided between each adjacent two of the battery cells 3, and between the battery cells 3 at both ends and the inner wall of the battery stack case 9. This spacer 10B is for electrical insulation between the adjacent battery cells 3, formation of a cooling air path, guiding of the cooling air, or prevention of expansion of the battery cells 3.

The spacer 10B is made of insulating material, and provides the gaps 12 allowing the cooling air to flow between the adjacent battery cells 3. The spacers 10B are connected to one another by their connecting parts 25. The spacers 10B, which can be fabricated easily by molding resin material, are housed as one component within the battery stack 2.

Since the spacers 10B have the corrugated shape, many gaps 12 are formed at both sides thereof, and the battery cells 3 can be cooled uniformly by the cooling air passing through the gaps 12. The spacers 10B are disposed between the respective adjacent battery cells 3 to form the cooling air path which enables the cooling air blown from the fan device 13 to flow vertically along the lateral sides of the battery cells 3.

The fourth embodiment provides the following advantage. The spacer 10B includes a lateral part 10c disposed facing the lateral side of the cell battery 3 and the connecting part 25 for connection with the other spacers 10B. Accordingly, in this embodiment, the spacers 10 B can be handled as a single spacer component.

Fifth Embodiment

Figure 9:
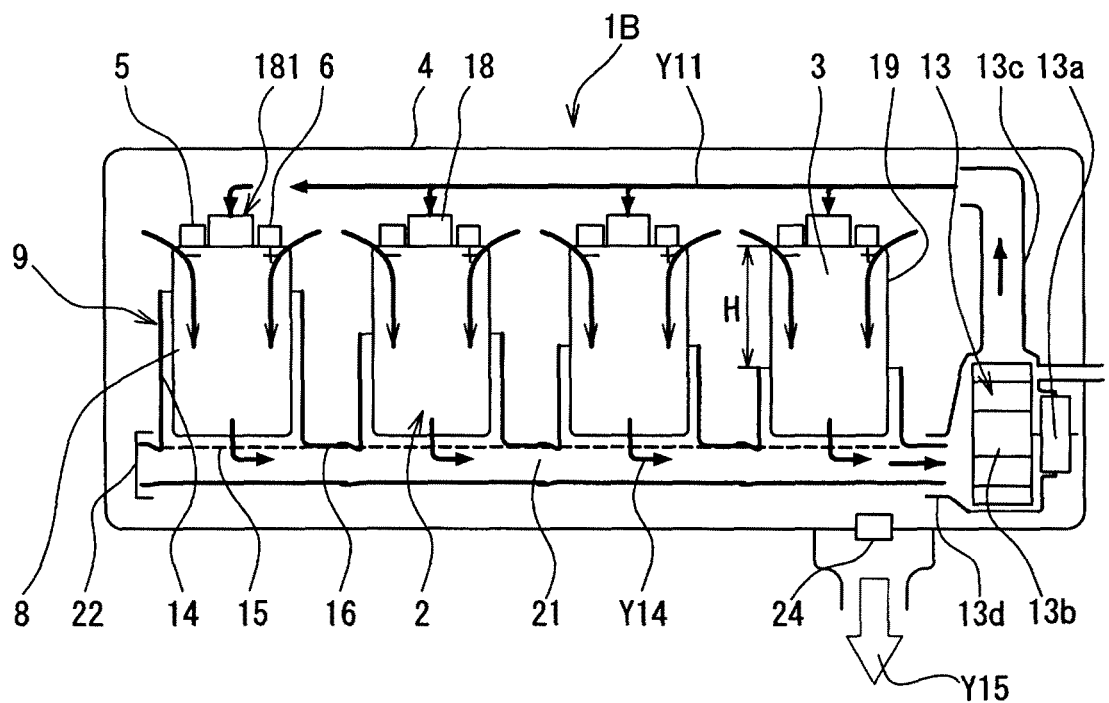
FIG. 9 is a diagram schematically showing the internal structure of a battery pack according to a fifth embodiment of the invention.

Next, a fifth embodiment of the invention is described with a focus on differences with the above described embodiments. FIG. 9 is a diagram schematically showing the internal structure of a battery pack 1B according to the fifth embodiment of the invention. The battery pack 1B includes the battery pack case 4 which is closed and has a roughly rectangular shape. In this embodiment, four battery stacks 2 are arranged in the battery pack case 4 as shown in FIG. 9. Each of the battery stacks 2 is constituted of three battery cells 3 stacked on one another as in the first embodiment.

The spacer 10 (not shown) is provided between each adjacent two of the battery cells 3, and between the battery cells 3 at both ends and the inner wall of the battery stack case 9.

The spacers 10 are made of insulating material, and provide the gaps 12 allowing the cooling air to flow between the adjacent battery cells 3. The spacers 10 are disposed separately from one another so as to face the lateral sides of the battery stacks 2, respectively. The spacers 10 are disposed between the respective adjacent battery cells 3 to form the cooling air path enabling the cooling air blown from the fan device 13 to flow along the lateral sides of the battery cells 3.

As shown in FIG. 9, the battery cell 3 includes the positive electrode terminal 5 and the negative electrode terminal 6 at its upper side. Each battery stack 2 is housed in the battery holding part 14 having a cylindrical shape and constituting part of the battery stack case 9 holding the battery stack 2.

As shown in FIG. 9, there are four battery holding parts 14 in number in this embodiment. The battery holding part 14 is formed with the bottom part 15 of the wire mesh structure having aeration property. Between the respective adjacent battery holding parts 14, sealing is made to block the cooling air. That is, between the adjacent battery stacks 2, the blocking part 16 is provided to block the cooling air blown from the fan device 13.

The fan device 13 is provided inside the battery pack case 4 to generate an air stream (the cooling wind) within the battery pack case 4. An exhaust part configured to open to exhaust gas when the pressure of the inside of the battery cell 3 exceeds a predetermined pressure is provided between the electrode terminals 5 and 6. The exhaust duct 18 is provided so that the gas exhausted from a plurality of the exhaust parts is collected and exhausted to outside the battery pack case 4. The exhaust duct 18 is in contact with the surface of the battery cells 3 between the electrode terminals 5 and 6.

The battery cells 3 are connected in series within the battery stack 2 through the bus bars 7 (not shown). The height of the battery stack case 9 is set such that part of each battery cells 3 is exposed. Likewise, the height of the spacer 10 is set such that part of each battery cells 3 is exposed.

That is, the battery cell 3 includes the exhaust portion 19 projecting from the spacer 10 at its upper side so that the inflow side of the cooling air is exposed to allow the cooling air to flow in easily.

The size of the exposed portion 19 is different for each battery stack 2. In this embodiment, the height of the exposed portion 19 is smaller with the increase of the distance to the fan device 13. The heat emitted from the lateral sides of the battery cells 3 is transferred to the inner surface of the battery pack case 4 through the cooling air and dissipated from the battery pack case 4 to the atmosphere.

The cooling air that has passed through the gaps 12 of the spacers 10 passes through the bottom portion 15 of the wire mesh structure and is guided to the inlet 13d of the fan device 13 through the communication passage 21 constituting part of the battery stack case 9. The exposed portions 19 are in communication with the inlet 13d of the fan device 13 through the spacers 10.

The exhaust duct 18 forms the single-side mounted component 181 located on the upper side of the battery cell 3. The single-side mounted component 181 may be formed of, together with or instead of the exhaust duct 18, an electronic component having a control circuit for battery monitoring and controlling.

In this embodiment, since the cooling air is blocked by the single-side mounted component 181 such as the exhaust duct 18, the battery cell 3 cannot be sufficiently cooled. Accordingly, the exposed portion 19 is located between the single-side mounted component 181 and the spacer 10. The portions other than the exposed portions 19 of the battery cells 3 are cooled by the cooling air passing through the gaps 12 within the spacers 10.

In this embodiment, the surface to be cooled of the battery cell 3 is exposed from the spacer 10 or the battery stack case 9. Exposing the surface to be cooled of the battery cell 3 makes it possible to reduce the effect of the ventilation resistance by the one side-mounted component 18 so that the battery cell 3 can be cooled sufficiently.

The amount of the cooling air supplied from the fan device 13 is different for each battery stack 2. The size of the exposed portion 19 is set larger when the amount of the heat emitted therefrom is larger, or it is harder to be cooled so that it can be sufficiently cooled. Hence, according to this embodiment, the battery stacks 2 can be cooled uniformly.

Incidentally, conversely to the case shown in FIG. 9, the height of the exposed portion 19 may be set larger with the increase of the distance to the fan device 13 depending on the characteristic of the fan device 13 or the shape of the blower case 13c.

The fifth embodiment of the invention provides the following advantages. In the fifth embodiment, the battery packs 2 are arranged in a row within the battery pack case 4, and the cooling air blown from the fan device 13 flows around the battery stacks 2 and returns to the fan device 13. The exposed length H of the battery cells 3 is different for each battery stack 2. Hence, according to this embodiment, it is possible to adjust the cooling for each of the battery stacks 2.

In this embodiment, the exposed length H for the battery stack 2 closer to the fan device 13 is set larger than that of the battery pack 2 farther from the fan device 13 so that the battery stacks 2 are cooled uniformly.

Other Embodiments

It is a matter of course that various modifications can be made to the above described embodiments as described below.

In the above embodiments, the battery pack case 4 has the closed structure. However, the battery pack case 4 may have an open structure in which the cooling air blown from an external fan device is introduced into the battery pack case 4 through a duct.

The fluid within the battery pack case 4 may be gas other than air. In the above embodiments, since the battery pack case 4 has the closed structure, the battery cell case 8 is not required to have a dust-proof or water-proof structure. The battery pack case 4 may have a frame structure or a case-structure.

In the above embodiments, the height of the battery holding part 14 is approximately the same as that of the spacer 10. However, the height of the battery holding part 14 may be lower than that of the spacer 10. The battery holding part 14 may have a shape other than the cylindrical shape or the case shape. For example, the battery holding part 14 may have a band shape appropriate for gripping the spacers 10 and the battery cells 3.

The battery holding part 14 may have a cage-like shape having a number of ventilation holes.

The above explained preferred embodiments are exemplary of the invention of the present application which is described solely by the claims appended below. It should be understood that modifications of the preferred embodiments may be made as would occur to one of skill in the art.

What is claimed is:

1. A battery pack comprising:
battery stacks each formed of battery cells stacked on one another and bus bars disposed at a first end side of the battery stack for connection between electrode terminals of the battery cells;
a battery pack case housing the battery stacks;
a fan device disposed inside the battery pack case for circulating fluid within the battery pack case;
a communicating passage closed at one end and connected to an inlet of the fan device, the communicating passage being configured to enable the fluid that passes through each of the battery stacks to flow directly into the fan device; and
a spacer disposed between respective adjacent battery cells to guide the fluid blown from the fan device to flow in a direction from the first end side to a second end side opposite to the first end side along lateral sides of the battery cells, wherein
each of the battery cells includes a battery cell case as an outer shell thereof that includes an exposed portion having a predetermined exposed length by which the battery cell case projects from an end at the first end side of the spacer.

2. The battery pack according to claim 1, further comprising a single-side mounted component provided for each of the battery stacks, the single-side mounted component including at least one of a control circuit provided for each of the battery cells and a duct for discharging gas emitted from the battery cells, the exposed portion being located between the single-side mounted component and the spacer.

3. The battery pack according to claim 1, wherein the spacer is disposed so as to be in contact with the adjacent battery cells so that the adjacent battery cells are cooled by the fluid passing through the spacer.

4. The battery pack according to claim 1, wherein the battery pack case houses the battery stacks in a sealed state.

5. The battery pack according to claim 1, wherein
the battery stacks are arranged in a row, and
the exposed length of the exposed portion is different for each battery stack.

6. The battery pack according to claim 1, wherein the spacers are disposed separately from one another so as to face the lateral sides of the battery stacks, respectively.

7. The battery pack according to claim 1, wherein each of the spacers includes a lateral part disposed facing the lateral side of the cell battery and a connecting part for connection with the lateral parts of other spacers.

8. The battery pack according to claim 1, wherein each of the spacers is formed with comb-shaped projections, and the battery pack is configured so that the fluid blown from the fan device flows into the inlet of the fan device by way of the exposed portions and gaps formed by the comb-shaped projections.

9. The battery pack according to claim 1, wherein the exposed length is between 10% and 70% of a length between one end at the first end side and the other end at the second end side of the battery cell case.

10. The battery pack according to claim 1, wherein the exposed length is between 20% and 60% of a length between one end at the first end side and the other end at the second end side of the battery cell case.

11. A battery pack comprising:
battery stacks each formed of battery cells stacked on one another and bus bars disposed at a first end side of the battery stack for connection between electrode terminals of the battery cells;
a battery pack case housing the battery stacks;
a fan device disposed inside the battery pack case for circulating fluid within the battery pack case; and
a spacer disposed between respective adjacent battery call to guide the fluid blown from the fan device to flow in a direction from the first end side to a second end side opposite to the first end side along lateral sides of the battery cells, wherein
each of the battery cells includes a battery cell case as an outer shell thereof that includes an exposed portion having a predetermined exposed length by which the battery cell case projects from an end at the first end side of the spacer,
the battery stacks are arranged in a row,
the battery pack further comprising a communicating passage enabling the fluid blown from the fan device and flowing around the battery cells to return to the fan device,
the exposed length of the exposed portion is different for each battery stack, and
the exposed length for the battery stack closer to the fan device is larger than the exposed length of the battery stack farther from the fan device.

12. A battery pack comprising:
battery stacks each formed of battery cells stacked on one another and bus bars disposed at a first end side of the battery stack for connection between electrode terminals of the battery cells;

a battery pack case housing the battery stacks;

a fan device disposed inside the battery pack case for circulating fluid within the battery pack case; and a spacer disposed between respective adjacent battery cell to guide the fluid blown from the fan device to flow in a direction from the first end side to a second end side opposite to the first end side along lateral sides of the battery cells, wherein each of the battery cell includes a battery cell case as an outer shell thereof that includes an exposed portion having a predetermined exposed length by which the battery cell case projects from an end at the first end side of the spacer, the battery stacks are arranged in a row, the battery pack further comprising a communicating passage enabling the fluid blown from the fan device and flowing around the battery cells to return to the fan device, the exposed length of the exposed portion is different for each battery stack, and a blocking part is provided between each adjacent two of the battery stacks to block the fluid blown from the fan device from entering the communicating passage.

* * * * *